US012766432B2

(12) United States Patent
Miller

(10) Patent No.: US 12,766,432 B2
(45) Date of Patent: Oct. 20, 2026

(54) METHODS AND APPARATUS FOR REJECTING MOISTURE FROM A DESICCANT SOLUTION

(71) Applicant: Jacob Miller, Sudbury, MA (US)

(72) Inventor: Jacob Miller, Sudbury, MA (US)

( * ) Notice: Subject to any disclaimer, the term of this patent is extended or adjusted under 35 U.S.C. 154(b) by 343 days.

(21) Appl. No.: 18/374,712

(22) Filed: Sep. 29, 2023

(65) Prior Publication Data

US 2024/0108999 A1 Apr. 4, 2024

(30) Foreign Application Priority Data

Sep. 30, 2022 (GB) ..................................... 2214376

(51) Int. Cl.
*B01D 1/00* (2006.01)
*B01D 53/14* (2006.01)

(52) U.S. Cl.
CPC .......... *B01D 1/0082* (2013.01); *B01D 1/0011* (2013.01); *B01D 53/1412* (2013.01); *B01D 53/1425* (2013.01); *B01D 2257/80* (2013.01)

(58) Field of Classification Search
CPC ........................... B01D 1/0082; B01D 1/0011; B01D 53/1412; B01D 53/1425; B01D 2257/80; B01D 1/14; B01D 53/263; B01D 61/422; B01D 2258/06; B01D 2311/04; B01D 2311/2673; B01D 61/44; F24F 3/1417; F24F 2003/1458
See application file for complete search history.

(56) References Cited

U.S. PATENT DOCUMENTS 4,979,965 A * 12/1990 Sannholm ............ B01D 53/263 95/231
4,995,242 A * 2/1991 Assaf .................... F24F 5/0014 62/271
5,797,272 A * 8/1998 James .................... F24F 3/1411 62/93
12,510,257 B2 * 12/2025 Farese .................. B01D 53/263
12,515,166 B2 * 1/2026 Beh .................... B01D 53/1425
(Continued)

FOREIGN PATENT DOCUMENTS

CN 105164484 A * 12/2015 ............... F28D 5/02
CN 108744899 A * 11/2018 ........... B01D 53/263
(Continued)

OTHER PUBLICATIONS

Epo translation of FR 2703441 (Year: 1994).*
(Continued)

*Primary Examiner* — Stephen Hobson
(74) *Attorney, Agent, or Firm* — Haynes and Boone, LLP

(57) ABSTRACT

A method of rejecting moisture from a working desiccant solution and regenerating the working desiccant solution comprises receiving a stream of desiccant solution containing moisture to be rejected (12), and diluting at least a portion of the stream of desiccant solution containing moisture to be rejected, to form a diluted stream (38). The method further comprises passing the diluted stream (38) through an evaporator (24) for evaporating the moisture from the diluted stream; concentrating the desiccant solution, thereby to regenerate the desiccant solution; and outputting a regenerated stream of desiccant solution (14).

7 Claims, 7 Drawing Sheets

(56) References Cited

U.S. PATENT DOCUMENTS

| | | | | |
|---|---|---|---|---|
| 2014/0150481 | A1* | 6/2014 | Vandermeulen | B01D 53/263 62/271 |
| 2018/0202671 | A1* | 7/2018 | Martin | F28B 9/06 |
| 2019/0184334 | A1* | 6/2019 | Moghaddam | F25B 15/02 |
| 2019/0240623 | A1* | 8/2019 | Beh | B01D 61/423 |
| 2019/0374902 | A1* | 12/2019 | Ungerer | B01D 53/263 |
| 2020/0063995 | A1* | 2/2020 | LePoudre | F24F 6/02 |
| 2020/0096212 | A1* | 3/2020 | LePoudre | F24F 5/0014 |
| 2020/0164312 | A1* | 5/2020 | Beh | B01D 53/1425 |
| 2020/0182493 | A1* | 6/2020 | Luttik | A01G 9/246 |
| 2020/0393145 | A1* | 12/2020 | Woods | F24F 3/1417 |
| 2021/0239333 | A1* | 8/2021 | LePoudre | F24F 3/1417 |
| 2021/0370228 | A1* | 12/2021 | Benedict | B01D 53/1425 |
| 2022/0196263 | A1* | 6/2022 | Woods | F24F 3/1417 |
| 2022/0223885 | A1* | 7/2022 | Beh | B01D 61/461 |
| 2022/0243932 | A1* | 8/2022 | Benedict | B01D 53/18 |
| 2022/0299223 | A1* | 9/2022 | Benedict | B01D 53/18 |
| 2022/0410070 | A1* | 12/2022 | Beh | B01D 61/422 |
| 2023/0135067 | A1* | 5/2023 | Woods | F24F 13/30 62/271 |
| 2023/0191312 | A1* | 6/2023 | Benedict | B01D 53/1425 95/193 |
| 2023/0280049 | A1* | 9/2023 | Farese | B01D 53/263 62/271 |
| 2024/0053032 | A1* | 2/2024 | LePoudre et al. | F24F 5/0035 |
| 2024/0108999 | A1* | 4/2024 | Miller | B01D 1/0011 |
| 2024/0109023 | A1* | 4/2024 | Miller | B01D 53/1425 |
| 2024/0210050 | A1* | 6/2024 | Ellman | B01D 53/265 |

FOREIGN PATENT DOCUMENTS

| | | | | | |
|---|---|---|---|---|---|
| CN | 110790441 | A | * | 2/2020 | C02F 9/00 |
| CN | 112325404 | A | * | 2/2021 | F24F 5/0042 |
| CN | 112325406 | A | * | 2/2021 | F24F 5/0042 |
| CN | 113104940 | A | * | 7/2021 | C02F 1/469 |
| CN | 113432211 | A | * | 9/2021 | F24F 13/30 |
| FR | 2703441 | A1 | * | 10/1994 | F25B 41/10 |
| FR | 2703442 | A1 | * | 10/1994 | F25B 15/06 |
| WO | WO-2020016012 | A1 | * | 1/2020 | B01D 53/1425 |

OTHER PUBLICATIONS

Search Report for GB application No. 2214376.2 mailed Dec. 1, 2022, 8 pages.

Search Report for GB application No. 2214377.0 mailed Dec. 7, 2022, 4 pages.

* cited by examiner

METHODS AND APPARATUS FOR REJECTING MOISTURE FROM A DESICCANT SOLUTION

STATEMENT OF GOVERNMENTAL SUPPORT

This invention was made with government support under Award No. DE-AR0001664 awarded by Advanced Research Projects Agency—Energy. The government has certain rights in the invention.

This application claims the benefit of application GB 2214376.2, filed Sep. 30, 2022, which is hereby incorporated by reference in its entirety as if fully set forth herein.

FIELD OF THE INVENTION

The present invention concerns methods and apparatus for rejecting moisture from a desiccant solution. It has particular, but not exclusive, application to rejecting moisture from desiccant solution in a liquid desiccant dehumidifier or air conditioner. The invention also concerns methods and apparatus for diluting a first stream of desiccant solution and concentrating a second stream of desiccant solution.

BACKGROUND OF THE INVENTION

Liquid desiccant dehumidifiers operate by introducing humid air to a liquid desiccant either by direct contact, for example by spraying liquid desiccant into an airstream, or indirectly, for example by situating liquid desiccant on one side of a porous membrane and air on the other. The liquid desiccant provides a lower level of vapour pressure than water at the same temperature, meaning that humidity from sufficiently humid air will naturally, without power input, flow to the desiccant. The desiccant absorbs some of the water, resulting in dehumidified air and slightly diluted desiccant. Once the liquid desiccant has absorbed water, the water must be rejected from the desiccant solution so it can regain its initial concentration (and be recycled back to the dehumidifier to set up a closed loop cycle, for instance).

In existing systems of the art, typically the regeneration process involves heating the liquid desiccant to high temperatures to boil off water vapour, thereby concentrating the desiccant solution. This requires significant heat energy, however, making the process relatively inefficient.

Attempts to improve the efficiency of the regeneration step include the use of thermal regeneration systems, or heat pumps. For example, technology as described in WO2017185002A1 utilizes a liquid desiccant dehumidification scheme which relies on a high temperature heat pump to regenerate the desiccant. Similarly, technology as described in US20200386421A1 uses a liquid desiccant dehumidification system which employs heat pumps at a lower temperature to regenerate the desiccant. However, there is still a high energy cost associated with dehumidifying a humid air stream.

In some methods and apparatus for diluting a first stream of desiccant solution and concentrating a second stream of desiccant solution (as may be used in a liquid desiccant dehumidifier or air conditioner), the first and second streams are brought into close proximity with one another. For instance, the first and second streams may run past one another across a semi-permeable membrane through which water or desiccant ions can pass. One problem with the two streams passing in close proximity to one another is that there is relatively little thermal insulation between the two streams. The first stream heats up as it is diluted, and the second stream cools down as it is concentrated, and in some circumstances one or both of these temperature changes could advantageously be exploited elsewhere in the system. However, due to the close proximity of the two streams these heating and cooling effects are short-lived-heat can move easily from the first stream to the second stream, lessening or eliminating the changes in temperature caused by the dilution and concentration.

It is an object of the present invention to mitigate or obviate one or more of the above disadvantages, and/or to provide an improved or alternative method or apparatus.

SUMMARY OF THE INVENTION

According to a first aspect of the present invention there is provided a method of rejecting moisture from a working desiccant solution and regenerating the working desiccant solution comprising:

receiving a stream of desiccant solution containing moisture to be rejected;

diluting at least a portion of the stream of desiccant solution containing moisture to be rejected, to form a diluted stream;

passing the diluted stream through an evaporator for evaporating the moisture from the diluted stream;

concentrating the desiccant solution, thereby to regenerate the desiccant solution; and outputting a regenerated stream of desiccant solution.

By diluting at least a portion of the used desiccant solution to form the diluted stream, and then passing the diluted stream through the evaporator, the equilibrium vapour pressure (EVP) of desiccant passing through the evaporator can be increased. This increase in EVP can mean that less energy must be input in order to reject water from the desiccant. Indeed, the dilution may increase the EVP above the partial pressure of water at ambient temperature and humidity (for instance to above about 2.5 kPa or above about 3 kPa), whereupon water may be rejected without any further energy being required. The lower energy requirements provided by the method may therefore make it more energy efficient.

The solution is typically aqueous and the desiccant is typically an ionic salt, for instance lithium chloride. Dilution may occur by adding water, removing desiccant salt, and/or by merging said stream into a dilute stream. Concentration may occur by removing water, adding pure desiccant and/or adding a more concentrated desiccant solution.

Dilution may have the effect of increasing the EVP of the desiccant to above the partial vapour pressure of water at ambient temperature and humidity, for instance to above about 2.5 kPa or above about 3 kPa.

It is to be understood that the stream of desiccant solution containing moisture to be rejected may have been formed by dilution (i.e. by addition of the moisture to be rejected). Accordingly, the step of diluting at least a portion of said stream may be considered to be a second dilution of the desiccant. In other words, the method may comprise diluting desiccant a first time to form the stream of desiccant solution containing moisture to be rejected, and diluting at least some of that desiccant a second time to form the diluted stream.

The stream of desiccant solution containing moisture to be rejected may be a non-saturated solution (the diluted stream thus also being a non-saturated solution). Instead or as well, the regenerated stream of desiccant solution may be a non-saturated solution. Where the stream of desiccant solution containing moisture to be rejected and the regenerated stream of desiccant solution are both non-saturated solutions, the method may comprise preventing any desiccant solution from becoming saturated.

The method may further comprise transporting water from the diluted stream after the evaporation step to said at least a portion of the stream of desiccant solution containing moisture to be rejected prior to the evaporation step, thereby diluting the stream of desiccant solution containing moisture to be rejected and concentrating the diluted stream.

Water may be transported from the diluted stream, to said at least a portion of the stream of desiccant solution containing moisture to be rejected, by reverse osmosis.

For example, water may be transported from the diluted stream, to said at least a portion of the stream of desiccant solution containing moisture to be rejected, by counterflow reverse osmosis.

The diluted stream may be formed in a diluter portion of a combined diluter-concentrator device and the regenerated stream may be formed in a concentrator portion of a combined diluter-concentrator device.

The diluted stream may be formed in a diluter portion of a combined diluter-concentrator device and the regenerated stream may be formed in a concentrator portion of that combined diluter-concentrator device. Alternatively, the diluted stream may be formed in a diluter portion of a first combined diluter-concentrator device and the regenerated stream may be formed in a concentrator portion of a second combined diluter-concentrator device. An auxiliary fluid may circulate between the first and second combined diluter-concentrator devices.

The method may further comprise pressurising the desiccant solution before it is concentrated.

The method may further comprise passing desiccant solution through a pressure recovery device after it has been concentrated.

The method may further comprise cooling said at least a portion of the stream of desiccant solution containing moisture to be rejected before said dilution.

The method may further comprise heating at least a portion of the diluted stream before said evaporation.

The method may further comprise passing said at least a portion of the stream of desiccant solution containing moisture to be rejected, and said at least a portion of the diluted stream, through a desiccant stream heat exchanger, the heat exchanger transferring heat from said at least a portion of the stream of desiccant solution containing moisture to be rejected to said at least a portion of the diluted stream.

The step of passing the diluted stream through an evaporator may comprise drawing heat into the diluted stream from air inside the evaporator. In this manner, air inside the evaporator (for example air into which moisture from the diluted stream will be, is being or has been evaporated) can be used to warm desiccant solution, thereby raising its vapour pressure and increasing the prevalence of moisture evaporation.

Where the step of passing the diluted stream through an evaporator comprises drawing heat into the diluted stream from air inside the evaporator, the method may further comprise cooling at least some of the working desiccant solution so as to counterbalance heat entering the desiccant in the evaporator.

The method may further comprise bypassing a desiccant stream heat exchanger (such as the desiccant stream heat exchanger discussed above). Bypassing a desiccant stream heat exchanger may be beneficial in conditions where the action of that heat exchanger would be counterproductive (for instance by acting as a flow restriction and/or transferring heat in an undesired direction).

Where the method comprises bypassing a desiccant stream heat exchanger, the method may further comprise subsequently re-engaging the desiccant stream heat exchanger (i.e. un-bypassing the desiccant stream heat exchanger). This can allow the heat exchanger to begin to function again if the conditions causing the action of the heat exchanger to be counterproductive no longer apply (i.e. if the conditions become such that the action of the desiccant stream heat exchanger would be beneficial).

The method may further comprise forming the stream of desiccant solution containing moisture to be rejected, the diluted stream and the regenerated stream into a single continuous flow of desiccant.

The method may further comprise:

circulating a desiccant solution around a first loop, and circulating a dilute desiccant solution around a second loop which passes through the evaporator;

diverting a portion of the desiccant solution from the first loop and merging it into the second loop before evaporation; and re-diluting desiccant solution in the second loop and re-concentrating desiccant solution in the first loop.

In a given time period, the volume of water which leaves the first loop as part of the diverted portion of the desiccant solution may be substantially equal to the amount of water which is evaporated from the diluted stream in the evaporator.

The desiccant solution diverted from the first loop may be at least partially diluted before being merged into the second loop.

Before being merged into the second loop, the desiccant solution diverted from the first loop may be diluted to a concentration lower than that of the desiccant solution with which it is merged, merging of the diverted solution into the second loop thereby at least partially re-diluting the desiccant solution in the second loop.

Alternatively, the desiccant solution diverted from the first loop may be diluted at least partly by virtue of being merged into the second loop.

The method may further comprise diverting some of the desiccant solution from the second loop, concentrating it and then merging it into the first loop so as to at least partially re-concentrate the desiccant solution in the first loop.

The desiccant may be a salt solution.

For instance, the desiccant may comprise at least one of: lithium chloride; lithium bromide; magnesium chloride; calcium chloride; potassium formate; potassium acetate; sodium formate and sodium acetate.

Optionally:

dilution to form the diluted stream takes place by interaction, through a first combined diluter-concentrator device, between the stream of desiccant solution containing moisture to be rejected and an auxiliary fluid stream; and concentration to form the regenerated stream takes place by interaction, through a second combined diluter-concentrator device, between the auxiliary fluid stream and the diluted stream after evaporation.

According to a second aspect of the present invention there is provided a method of diluting a first stream of working solution and concentrating a second stream of working solution, the method comprising:

receiving the first stream of working solution;

diluting the first stream by interaction, in a first combined diluter-concentrator device, between the first stream and an auxiliary fluid stream;

receiving the second stream of working solution; and concentrating the second stream by interaction, in a second combined diluter-concentrator device, between the auxiliary fluid stream and the second stream of working solution.

With the first and second streams being diluted and concentrated respectively by interaction with the auxiliary fluid, the two streams need not pass in close proximity to one another. The two streams can therefore be better thermally insulated from another, which can allow one or both of the temperature changes produced by the dilution and concentration to be exploited to a greater extent.

In the second aspect of the invention, or in the first aspect of the invention where the method utilises an auxiliary fluid stream, the method may further comprise cycling the auxiliary fluid around an auxiliary fluid loop.

Optionally:

the auxiliary fluid is passed from the first combined diluter-concentrator device to the second combined diluter-concentrator device through an auxiliary fluid heat exchanger;

the auxiliary fluid is passed from the second combined diluter-concentrator device to the first combined diluter-concentrator device through said auxiliary fluid heat exchanger; and the auxiliary fluid heat exchanger transfers heat from the auxiliary fluid that is passing from the first combined diluter-concentrator device to the second combined diluter-concentrator device, to the auxiliary fluid that is passing from the second combined diluter-concentrator device to the first combined diluter-concentrator device.

The method may further comprise providing additional heat to the auxiliary fluid heat exchanger. The additional heat may be provided from the desiccant, for instance from at least a portion of the diluted stream after the evaporation step.

Optionally:

said dilution takes place by movement of water out of the auxiliary fluid stream in the first combined diluter-concentrator device; and said concentration takes place by movement of water into the auxiliary fluid stream in the second combined diluter-concentrator device.

As one alternative option:

said dilution takes place by movement of ions into the auxiliary fluid stream in the first combined diluter-concentrator device; and said concentration takes place by movement of ions out of the auxiliary fluid stream in the second combined diluter-concentrator device.

The auxiliary fluid may have a lower enthalpy of dilution than the working solution.

Instead or as well, the auxiliary fluid may exhibit a decrease in osmotic pressure with an increase in temperature.

The auxiliary fluid may comprise polyethylene glycol.

The method may further comprise filtering the desiccant.

The desiccant may suitably be filtered before said dilution to form the diluted stream.

The moisture may be evaporated from the diluted stream into an exhaust air flow through direct contact therebetween in a direct contact evaporator.

According to a third aspect of the present invention there is provided a method of dehumidifying an air flow, the method comprising:

passing the air flow through a dehumidifier and drawing moisture from the air into a stream of desiccant solution, thereby forming a stream of desiccant solution containing moisture to be rejected; and rejecting moisture from the desiccant solution and regenerating the desiccant using the method of the first aspect of the invention.

By utilising the method of the first aspect of the invention to reject moisture and regenerate the desiccant solution, the method of the third aspect of the invention can provide the improved energy efficiency discussed above.

The method may further comprise passing the regenerated stream into the dehumidifier and drawing moisture from the air into the regenerated stream so as to form the stream of desiccant solution containing moisture to be rejected.

Said moisture may be drawn from the air into the stream of desiccant solution through direct contact therebetween in a direct contact dehumidifier.

Optionally:

said air flow is passed through an air flow heat exchanger upstream of the dehumidifier;

said air flow is passed through said air flow heat exchanger downstream of the dehumidifier; and the air flow heat exchanger transfers heat from the air flow downstream of the dehumidifier, to the air flow upstream of the dehumidifier.

The method may further comprise cooling the desiccant solution before it enters the dehumidifier.

The desiccant solution may be cooled by indirect evaporative cooling, for instance with the desiccant solution passing through a set of pipes the outsides of which are sprayed with water which then evaporates into an exhaust air flow.

According to a fourth aspect of the present invention there is provided a method of cooling an air flow, the method comprising:

dehumidifying the air flow using the method of the third aspect of the invention; and drawing heat from the dehumidified air flow.

Since the method of the fourth aspect of the invention utilises the method of the first aspect of the invention to reject moisture and regenerate the desiccant solution, the fourth aspect of the invention can provide the improved energy efficiency discussed above.

Heat may be drawn from the dehumidified air flow into the stream of desiccant solution, before the stream of desiccant solution enters the dehumidifier and/or while the desiccant solution is inside the dehumidifier.

Heat may be drawn from the dehumidified air flow into moisture evaporating into the dehumidified airflow in an evaporator.

The heat may be drawn from the dehumidified air flow into said moisture through direct contact therebetween in a direct contact evaporator.

According to a fifth aspect of the present invention there is provided an apparatus for rejecting moisture from a desiccant solution and regenerating the desiccant solution for re-use, the apparatus comprising:

a desiccant recirculation system comprising an inlet for receiving a stream of desiccant solution containing moisture to be rejected, and an outlet for delivering a stream of regenerated desiccant solution;

an evaporator; and a desiccant concentration control system which is connected to the recirculation system intermediate the inlet and outlet of the recirculation system and comprises a desiccant diluter part that is configured and arranged to receive at least a portion of the stream of desiccant solution containing moisture to be rejected and to dilute the same and supply a diluted stream of desiccant to the evaporator, and a desiccant concentrator part that is configured and arranged to increase the concentration of the desiccant solution in the recirculation system intermediate the desiccant concentration control system and the outlet, thereby to regenerate the desiccant solution that is supplied to the outlet, wherein the evaporator is arranged to receive the diluted stream and to evaporate moisture therefrom.

With the evaporator being arranged to receive the dilute desiccant stream, in use the EVP of the desiccant solution passing through the evaporator can be advantageously high. As noted above, this in turn can mean that less energy or no energy may need to be input in order to reject the water in the evaporator, thereby making the apparatus more energy efficient.

The apparatus may be arranged for continuously rejecting moisture from the desiccant solution and regenerating the desiccant solution for re-use.

The stream of desiccant solution containing moisture to be rejected may be a non-saturated solution (the diluted stream thus also being a non-saturated solution). Instead or as well, the regenerated stream of desiccant solution may be a non-saturated solution. Where the stream of desiccant solution containing moisture to be rejected and the regenerated stream of desiccant solution are both non-saturated solutions, the apparatus may comprise desiccant solution substantially none of which is saturated.

The desiccant concentration control system may integrate the desiccant diluter part and the desiccant concentrator part, comprising a combined diluter-concentrator device having a first diluter portion, which is arranged to receive and dilute the at least a portion of the stream of desiccant solution containing moisture to be rejected, and a first concentrator portion, which is arranged to receive and concentrate at least a portion of the diluted desiccant stream from the evaporator, thereby to regenerate the desiccant solution; and the combined diluter-concentrator device may be adapted to transport water and/or desiccant ions between the diluter and concentrator portions.

The combined diluter-concentrator device may comprise at least one reverse osmosis device; preferably a counter-flow reverse osmosis device.

The apparatus may further comprise a high pressure pump for pumping the at least a portion of the diluted desiccant stream upstream of the first concentrator portion and a pressure energy recovery device downstream of the first concentrator portion.

The evaporator may be configured or configurable to encourage heat to be drawn into the diluted stream of desiccant from air inside the evaporator. This may allow air inside the evaporator (for example air into which moisture from the diluted stream of desiccant will be, is being or has been evaporated) to be used to warm desiccant solution, thereby raising its vapour pressure and increasing the rate of moisture evaporation.

In apparatus where the evaporator is configured to draw heat into the diluted stream of desiccant from air inside the evaporator, it is particularly beneficial for the apparatus to also comprise a cooling tower arranged to counterbalance the effect of heat entering the desiccant in the evaporator.

The combined diluter-concentrator device may be connected with the recirculation system such that first diluter portion receives the stream of desiccant solution containing moisture to be rejected from the inlet and delivers it to the evaporator, and the first concentrator portion receives the diluted desiccant stream from the evaporator and delivers it to the outlet.

As an alternative, the desiccant concentration control system may comprise a further recirculation system for circulating dilute desiccant solution from the first diluter portion to the first concentrator portion via the evaporator; the first diluter portion may be arranged to receive a portion of the stream of desiccant solution containing moisture to be rejected from the recirculation system and to deliver dilute desiccant solution to the further recirculation system; and the first concentrator portion may be arranged to receive dilute desiccant solution from the evaporator and deliver concentrated desiccant to the recirculation system.

The apparatus may further comprise a desiccant stream heat exchanger for transferring heat from desiccant solution containing moisture to be rejected upstream of the first diluter portion, to dilute desiccant solution upstream of the evaporator.

Where the apparatus comprises a desiccant stream heat exchanger, it may further comprise a heat exchanger bypass arrangement operable to prevent the flow of desiccant through the desiccant stream heat exchanger. Bypassing a desiccant stream heat exchanger may be beneficial in conditions where the action of that heat exchanger would be counterproductive (for instance by acting as a flow restriction and/or transferring heat in an undesired direction). The heat exchanger bypass arrangement may, for example, comprise a heat exchanger bypass passage which can be opened or closed (to bypass or un-bypass the desiccant stream heat exchanger) using one or more valves.

The combined diluter-concentrator device may further comprise a second diluter portion, a second concentrator portion and an auxiliary fluid circulation system which is arranged to circulate an auxiliary fluid between the second diluter portion and the second concentrator portion; and the combined diluter-concentrator device may be configured to transport water and/or desiccant ions between the first diluter portion and second concentrator portion and between the second dilutor portion and the first concentrator portion.

The auxiliary fluid may have a lower enthalpy of dilution than the desiccant solution.

The combined diluter-concentrator device may comprise a first reverse osmosis unit which incorporates the first diluter portion and second concentrator portion and a second reverse osmosis unit which incorporates the second dilutor portion and the first concentrator portion.

The auxiliary fluid may exhibit a decrease in osmotic pressure with an increase in temperature.

The apparatus may further comprise an auxiliary fluid heat exchanger for transferring heat from the auxiliary fluid upstream of the second dilutor portion to the auxiliary fluid upstream of the second concentrator portion.

The apparatus may further comprise a supplementary heat exchanger for transferring heat from dilute desiccant solution downstream of the evaporator to the auxiliary fluid upstream of the second concentrator portion.

The supplementary heat exchanger may be a 3-way heat exchanger which is further adapted for transferring heat from the auxiliary fluid upstream of the second dilutor portion to the auxiliary fluid upstream of the second concentrator portion.

The apparatus may further comprise a cooling tower for removing heat from dilute desiccant solution downstream of the evaporator.

According to a sixth aspect of the present invention there is provided a dehumidifier system comprising a desiccant dehumidifier which utilises a desiccant solution and the apparatus of the fifth aspect of the invention for rejecting moisture from the desiccant solution and regenerating the desiccant solution for re-use.

Since the system of the sixth aspect of the invention makes use of the apparatus of the fifth aspect of the invention, it too may be advantageously energy efficient.

The dehumidifier may be of the direct contact type or the membrane exchanger type, for example.

The dehumidifier may further comprise an air flow heat exchanger which is configured and arranged for transferring heat from air exiting the dehumidifier to air entering the dehumidifier.

According to a seventh aspect of the invention there is provided an air conditioning system comprising the dehumidifier system of the sixth aspect of the invention and an air cooling device which is configured and arranged to receive air exiting the dehumidifier system.

Because the system of the seventh aspect of the invention utilises the apparatus of the fifth aspect of the invention, it too may be advantageously energy efficient.

According to an eighth aspect of the present invention there is provided apparatus for diluting a concentrated stream of a working solution and concentrating a dilute stream of the working solution; the apparatus comprising a combined diluter-concentrator device having a first diluter portion which is arranged to receive the concentrated stream of the working solution; a first concentrator portion which is arranged to receive the dilute stream of working solution; a second diluter portion which is arranged to receive a concentrated stream of an auxiliary solution; and a second concentrator portion which is arranged to receive a dilute stream of the auxiliary solution; the combined diluter-concentrator device being configured to transport water and/or desiccant ions between the first diluter portion and second concentrator portion and between the second dilutor portion and the first concentrator portion, thereby to dilute the concentrated stream of the working solution and to concentrate the dilute stream of the working solution.

In use, the concentrated stream of primary solution is diluted through interaction with the auxiliary solution and the diluted stream of primary solution is concentrated through interaction with the auxiliary solution. Accordingly, the concentrated and diluted streams may not need to interact directly with one another and therefore may not need to be brought in close proximity to one another. This, in turn, can allow the two streams to be thermally insulated with one another so as to preserve one or both of the temperature changes brought about by the dilution and concentration as discussed above.

The apparatus may be arranged for continuously diluting the concentrated stream of working solution and concentrating the dilute stream of the working solution.

The auxiliary solution may have a lower enthalpy of dilution than the working solution.

The combined diluter-concentrator device may comprise a first reverse osmosis unit between the first diluter portion and second concentrator portion and a second reverse osmosis unit between the second dilutor portion and the first concentrator portion.

The auxiliary solution may exhibit a decrease in osmotic pressure with an increase in temperature.

The apparatus may further comprise an auxiliary fluid heat exchanger for transferring heat from the auxiliary fluid upstream of the second dilutor portion to the auxiliary fluid upstream of the second concentrator portion.

The apparatus may further comprise a filter for filtering the desiccant.

The filter may be positioned downstream of the inlet and upstream of the desiccant diluter part.

As an alternative, the filter may be positioned downstream of the evaporator and upstream of the desiccant concentrator part.

The apparatus may comprise two filters for filtering the desiccant, for instance a first filter positioned downstream of the inlet and upstream of the desiccant diluter part, and a second filter positioned downstream of the evaporator and upstream of the desiccant concentrator part.

According to a ninth aspect of the present invention there is provided apparatus for rejecting moisture from a desiccant solution and regenerating the desiccant solution for re-use, the apparatus comprising a desiccant recirculation system, a desiccant concentration control system comprising a desiccant diluter part and a desiccant concentrator part, and an evaporator, wherein:

- the desiccant recirculation system comprises an inlet for receiving a stream of desiccant solution containing moisture to be rejected, an outlet for delivering a regenerated stream of desiccant solution, ducting for connecting the inlet to the desiccant diluter part, and ducting for connecting the evaporator to the outlet;
- the desiccant diluter part is configured and arranged to receive the stream of desiccant solution containing moisture to be rejected and to dilute the same so as to form a diluted stream;
- the evaporator is configured and arranged to receive the diluted stream from the desiccant diluter part and to evaporate moisture therefrom;
- the desiccant concentrator part is configured and arranged to receive the diluted stream from the evaporator after evaporation, and to increase the concentration of said stream so as to form a regenerated stream of desiccant solution.

According to a tenth aspect of the present invention there is provided apparatus for rejecting moisture from a desiccant solution and regenerating the desiccant solution for re-use, the apparatus comprising a desiccant recirculation system, a desiccant concentration control system comprising a desiccant diluter part and a desiccant concentrator part, and an evaporator, wherein:

- the desiccant recirculation system comprises an inlet for receiving a stream of desiccant solution containing moisture to be rejected, an outlet for delivering a regenerated stream of desiccant solution, and ducting to connect the inlet to the outlet and form a first loop;
- the desiccant concentration control system comprises ducting arranged to provide a second loop of desiccant solution passing through the evaporator;
- the desiccant diluter part is configured and arranged to receive a portion of the stream of desiccant solution containing moisture to be rejected which is diverted from the first loop, to dilute the same and to supply dilute desiccant solution to the second loop so as to form a dilute stream of desiccant solution;
- the evaporator is configured and arranged to receive the diluted stream and to evaporate moisture therefrom;
- the desiccant concentrator part is configured and arranged to receive a portion of the diluted stream from the evaporator which is diverted from the second loop, to increase the concentration of said stream and to supply said stream to the first loop so as to form the regenerated stream.

In any apparatus according to the invention the apparatus may be configured to recirculate desiccant continuously in a continuous loop (for instance a continuous closed loop running through a dehumidifier). As an alternative, however, the apparatus may be configured to receive a stream of desiccant solution containing moisture to be rejected from a storage vessel, and/or may be configured to supply a regenerated stream of desiccant to a storage vessel, thereby allowing desiccant solution to be regenerated as a batch process rather than a continuous process. The same applies to any method according to the invention.

It will of course be appreciated that features described in relation to one aspect of the present invention may be incorporated into other aspects of the present invention. For example, the first aspect of the invention may incorporate any of the features described with reference to the second and/or third aspects of the invention and vice versa.

DESCRIPTION OF THE DRAWINGS

Embodiments of the present invention will now be described by way of example only with reference to the accompanying schematic drawings of which.

DETAILED DESCRIPTION

First Embodiment

Figure 1:
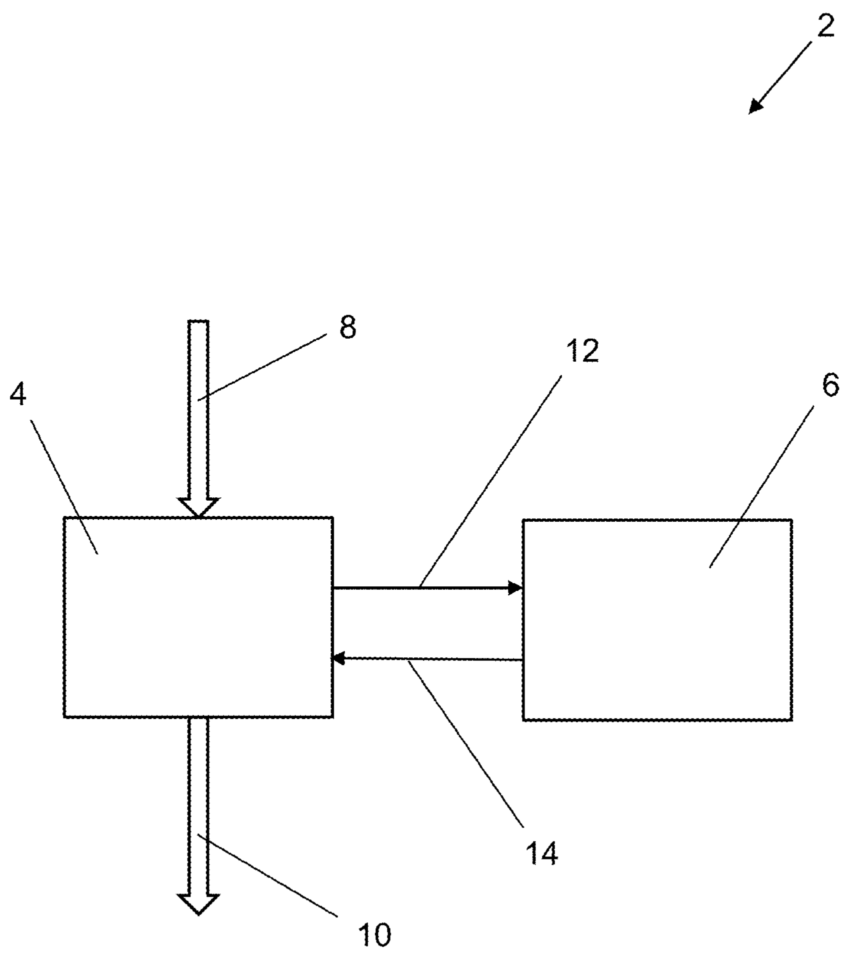
FIG. 1 is a schematic view of a dehumidifier system according to a first embodiment of the invention.

A dehumidifier system 2 according to a first embodiment of the invention is shown schematically in FIG. 1. The dehumidifier system 2 has a desiccant dehumidifier 4 and a regenerator 6.

The desiccant dehumidifier 4 utilises a liquid desiccant, in this case an aqueous solution of lithium chloride, to absorb moisture from a moist airflow 8 flowing into the dehumidifier 4. In this embodiment the desiccant dehumidifier 4 is a direct contact dehumidifier—in use, the desiccant solution is sprayed over a high surface area media (not shown) as the moist airflow 8 flows counterflow or crossflow across the media. The desiccant solution has a lower equilibrium vapour pressure (EVP) than the water vapour partial pressure in the air, therefore moisture from the moist air flow 8 is drawn into the desiccant solution, drying the air flow and slightly diluting the desiccant solution. The air flow then exits the dehumidifier 4 as a dry air flow 10, passing through a drift eliminator (not shown) which reduces or eliminates the extent to which droplets of the desiccant solution leave the dehumidifier 4 entrained in the air flow 10. The desiccant solution, now containing moisture absorbed from the air, is collected and passed to the regenerator 6 while fresh desiccant solution is sprayed so as to absorb water from the continued moist airflow 8.

The regenerator 6 is an apparatus for rejecting moisture from the desiccant solution and regenerating the desiccant solution for re-use. It receives a stream of desiccant solution containing moisture to be rejected 12 from the dehumidifier 4, rejects excess moisture and outputs a stream of regenerated desiccant solution 14. In this case the dehumidifier 4 and regenerator 6 are arranged in a closed loop, with the stream of regenerated desiccant solution 14 being fed back into the dehumidifier where it can be used to absorb more moisture from the moist air flow 8 before being passed back to the regenerator 6, and so on.

Figure 2:
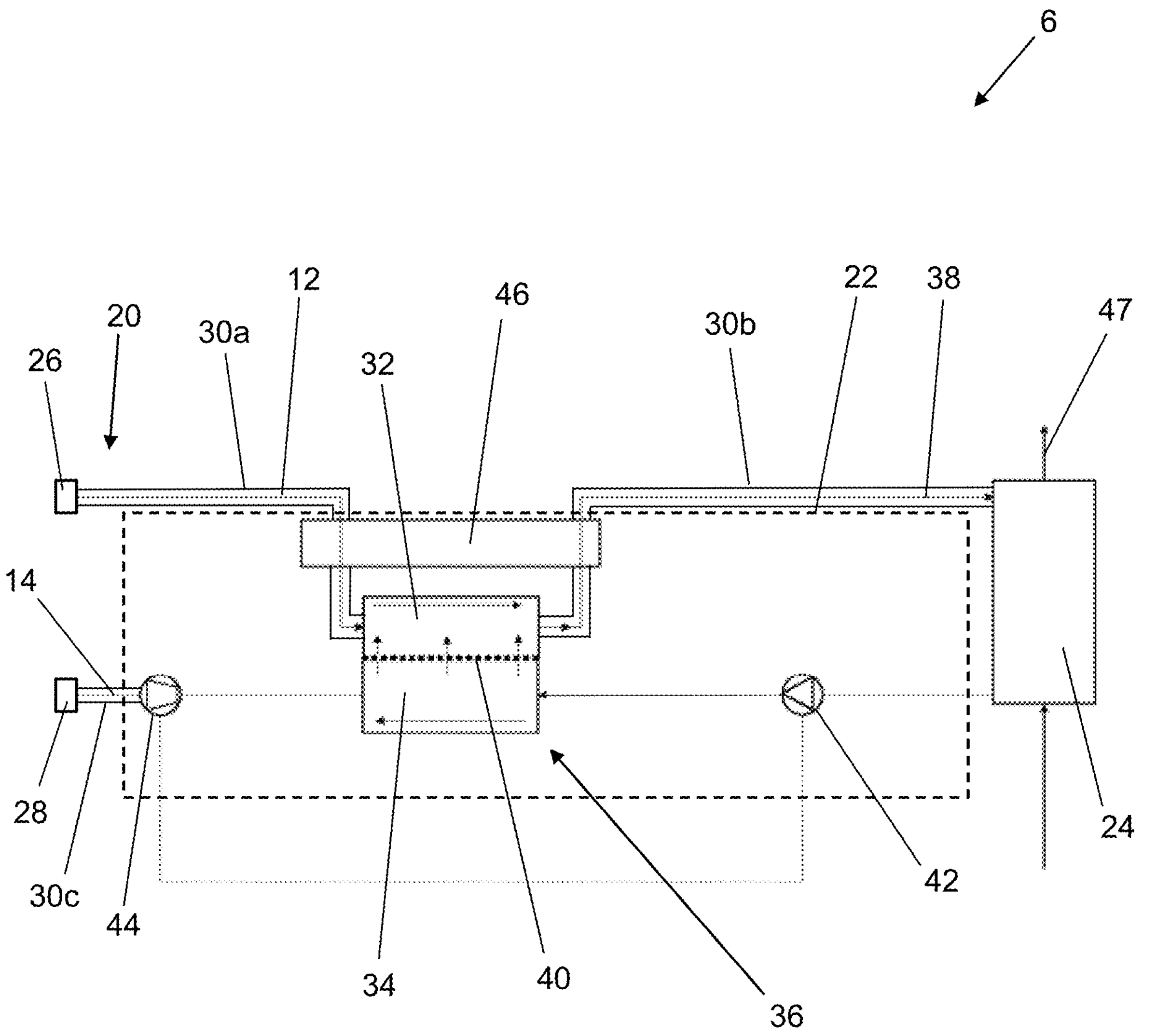
FIG. 2 is a schematic view of a regenerator of the dehumidifier system of FIG. 1.

A schematic of the regenerator 6 is shown in FIG. 2. The regenerator comprises a desiccant recirculation system 20, a desiccant concentration control system 22 and an evaporator 24. The recirculation system 20 has an inlet 26 for receiving the stream of desiccant solution containing moisture to be rejected 12, an outlet 28 for delivering the stream of regenerated desiccant solution 14, and ducting such as ducting **30*a* for directing the stream of desiccant solution containing moisture to be rejected 12 from the inlet 26 to the desiccant concentration control system 22, ducting 30*b* for directing desiccant solution to the evaporator 24, and ducting 30*c* for directing the stream of regenerated desiccant solution 14 from the desiccant concentration control system 22 to the outlet 28**.

The desiccant concentration control system 22 is connected to the recirculation system 20 and comprises a desiccant diluter part 32 and a desiccant concentrator part 34. In this embodiment the desiccant diluter part 32 and the desiccant concentrator part 34 are respective parts of a combined diluter-concentrator device 36. The desiccant diluter part 32 is formed by a first diluter portion of the combined diluter-concentrator device 36, and the desiccant concentrator part 34 is formed by a first concentrator portion of the combined diluter-concentrator device 36.

The desiccant diluter part 32 is configured and arranged to receive at least a portion of the stream of desiccant solution containing moisture to be rejected 12 and to dilute the same and supply a diluted stream of desiccant to the evaporator 24. In this particular case (and as discussed in more detail below) the desiccant diluter part 32 is configured and arranged to receive the entire stream of desiccant solution containing moisture to be rejected 12 and to dilute it to form a diluted stream 38, and the evaporator 24 is configured and arranged to receive the diluted stream 38 solely and in its entirety.

The desiccant concentrator part 34 of the combined diluter-concentrator device 36 is configured and arranged to increase the concentration of the desiccant solution in the recirculation system 20 intermediate the desiccant concentration control system 22 and the outlet 28, thereby to regenerate the desiccant solution that is supplied to the outlet. In the present embodiment specifically, the concentrator part 34 receives all the diluted stream 38 exiting the evaporator 24, increases its concentration and then supplies it as the entire regenerated stream 14 to the outlet 28 of the recirculation system. This too will be discussed in more detail later.

In this specific case the combined diluter-concentrator device 36 is a reverse osmosis device, more particularly a counter-flow reverse osmosis device. The reverse osmosis device 36 comprises a semi-permeable membrane 40 positioned between the desiccant diluter part 32 (the first diluter portion) and the desiccant concentrator part 34 (the first concentrator portion). On either side of the reverse osmosis device 36 is a high pressure pump 42, and a pressure energy recovery device 44 which in this embodiment takes the form of a turbine. The desiccant concentration control system 22 also comprises a desiccant stream heat exchanger 46 through which ducting 30*a* and ducting 30*b* each pass.

The evaporator 24 is arranged to receive the diluted stream 38 and to evaporate moisture therefrom into an exhaust airflow 47, thereby increasing the concentration of the desiccant solution. The exhaust airflow 47 can then be ejected to outside air, so as to expel the moisture. In this embodiment the evaporator 24 is a direct contact evaporator. As with the direct contact dehumidifier 4 discussed above, in use the desiccant solution is sprayed over a high surface area media (not shown) as an airflow flows counterflow or crossflow across the media. Whereas in the case of the dehumidifier 4 this resulted in moisture being absorbed into the desiccant solution from the water (thereby diluting the desiccant solution and drying the air), due to the desiccant being more diluted at this point, its EVP is higher than the water vapour partial pressure in the air. Thus, moisture evaporates from the desiccant solution into the air, increasing the concentration of the desiccant solution and increasing the humidity of the exhaust air flow 47.

It is noteworthy that in this embodiment, the combined diluter-concentrator device 36 is connected with the recirculation system 20 such that first diluter portion 32 receives the stream of desiccant solution containing moisture to be rejected 12 from the inlet 26 and delivers it to the evaporator 24, and the first concentrator portion 34 receives the dilute desiccant stream 38 from the evaporator 24 and delivers it to the outlet 28 (via ducting 30*c*). Indeed, the stream of desiccant solution containing moisture to be rejected 12, the diluted stream 38 and the stream of regenerated desiccant solution 14 form a single continuous flow of desiccant solution.

A method of operation of the dehumidifier system 2, and of the regenerator 6 in particular, will now be described with reference to FIGS. 1 and 2. In the dehumidifier 4, moisture from the moist air flow 8 is drawn into the desiccant solution as described above. The dehumidifier 4 then outputs the air flow as a dry air flow 10, and exhausts the stream of desiccant solution containing moisture to be rejected 12. This stream 12 enters the desiccant recirculation system 20 of the regenerator 6 through the inlet 26, then passes through ducting 30*a* and desiccant stream heat exchanger 46 into the desiccant diluter part 32 of the combined diluter-concentrator device 36. While in the desiccant diluter part 32, the desiccant solution is diluted by the transfer of water from desiccant solution in the desiccant concentrator part 34, through the membrane 40, by reverse osmosis. The desiccant then exits the desiccant diluter part 32 as the diluted stream 38, whereupon it passes through the desiccant stream heat exchanger 46 and into the evaporator 24. The diluted stream 38 loses water to an ambient air flow inside the evaporator 24, as described above, and exits the evaporator more concentrated than when it entered (but, in this embodiment, less concentrated than the stream of desiccant solution containing moisture to be rejected 12).

Desiccant exiting the evaporator 24 is drawn into the high pressure pump 42. The pump 42 not only draws desiccant solution towards it through suction, but also raises the pressure of desiccant solution exiting it. The pump 42 pressurises the stream of desiccant solution which then passes into the desiccant concentrator part 34 of the combined diluter-concentrator device 36.

As discussed above, inside the combined diluter-concentrator device 36 water is passed from the desiccant solution in the desiccant concentrator part 34, into the desiccant solution in the desiccant diluter part 32, through the membrane 40, by reverse osmosis. The desiccant solution in the desiccant diluter part 32 has a higher water content than the desiccant solution in the desiccant concentrator part 34 and this difference in osmotic pressure would ordinarily cause water to move from desiccant solution in the desiccant diluter part 32 to the desiccant solution in the desiccant concentrator part 34. However, the increase in pressure provided by the high pressure pump 42 overcomes the difference in osmotic pressure and water instead moves in the opposite direction. Thus, the desiccant solution in the desiccant diluter part 32 is diluted, as discussed above, and the desiccant solution in the desiccant concentrator part 34 is re-concentrated. The desiccant solution exits the desiccant concentrator part 34 as a regenerated stream 14.

The regenerated stream 14 leaves the combined diluter-concentrator device 36 still under high pressure due to the high pressure pump 42. The stream 14 then passes through the pressure energy recovery device 44. The pressure of the regenerated stream 14 drops across the energy recovery device 44, the turbine (not shown) of which is used to scavenge energy from the system which would otherwise be wasted. This energy can then be fed back into the system, e.g. to provide some of the power required to drive the pump 42.

After passing through the pressure energy recovery device 44, the regenerated stream 14 of desiccant solution leaves the regenerator 6 through the outlet 28 of the desiccant recirculation system 20. The regenerated stream 14 can then re-enter the dehumidifier 4 when required, collect more moisture, then be passed back to the regenerator 6, and so on.

The purpose of the desiccant stream heat exchanger 46 of this embodiment is to transfer heat from the stream of desiccant solution containing moisture to be rejected 12 before it enters the desiccant diluter part 32, into the diluted stream 38 after exiting the desiccant diluter part 32. The stream of desiccant solution containing moisture to be rejected 12 carries with it a potentially-useful quantity of heat, acquired in the condenser 4 due to the latent heat of condensation as water condenses into the desiccant solution. If the stream 12 were to enter the desiccant diluter part 32 directly then at least some this heat energy would be lost to the desiccant solution in the desiccant concentrator part 34 due to conduction. However, thanks to the heat exchanger 46 this energy is salvaged from the stream 12, cooling the stream before it is diluted. The salvaged energy is passed into the diluted stream 38 as it passes through the heat exchanger 46. The diluted stream is therefore not only heated by being diluted inside the desiccant diluter part 32, but is further heated by the heat exchanger 46. The temperature of the diluted stream 38 is therefore maximised, which is beneficial in that the increased temperature also increases the EVP of the stream 38. The increased EVP, in turn, means that water can be lost from the stream 38 more rapidly inside the evaporator 24.

Another benefit of the desiccant stream heat exchanger 46 is related to the fact that as the desiccant solution of the diluted stream 38 is exposed to the exhaust airstream and water is evaporated from the desiccant solution, its temperature falls. This temperature reduction lowers the EVP of the desiccant solution, making it more difficult for further moisture to be evaporated into the exhaust air stream. It is therefore important that the diluted stream 38 enters the evaporator 24 at a temperature that is high enough to accommodate the cooling effect without that effect leading to insufficient water being evaporated from the desiccant solution. In the absence of the heat exchanger 46 an electrical heater or a heat pump could be used to raise the temperature of the diluted stream 38, but this may negatively effect the energy consumption of the regenerator 6, and thus of the dehumidifier system 2 as a whole.

Second Embodiment

Figure 3:
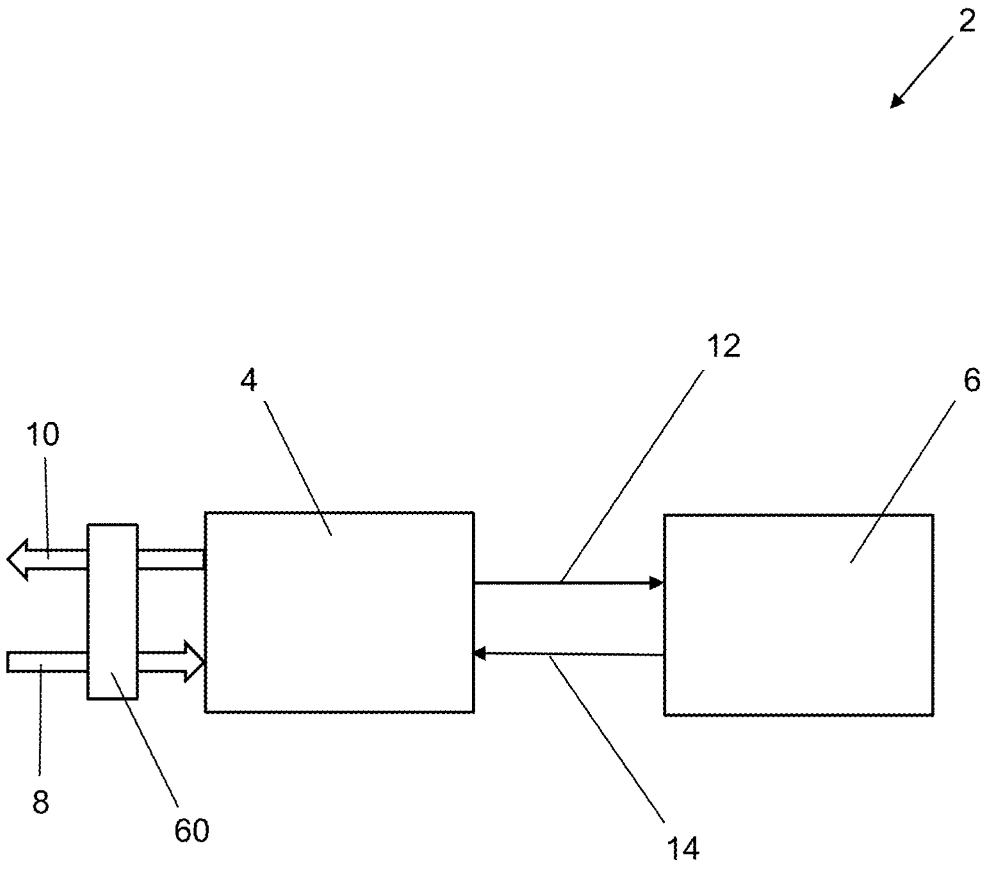
FIG. 3 is a schematic view of a dehumidifier system according to a second embodiment of the invention.
Figure 4:
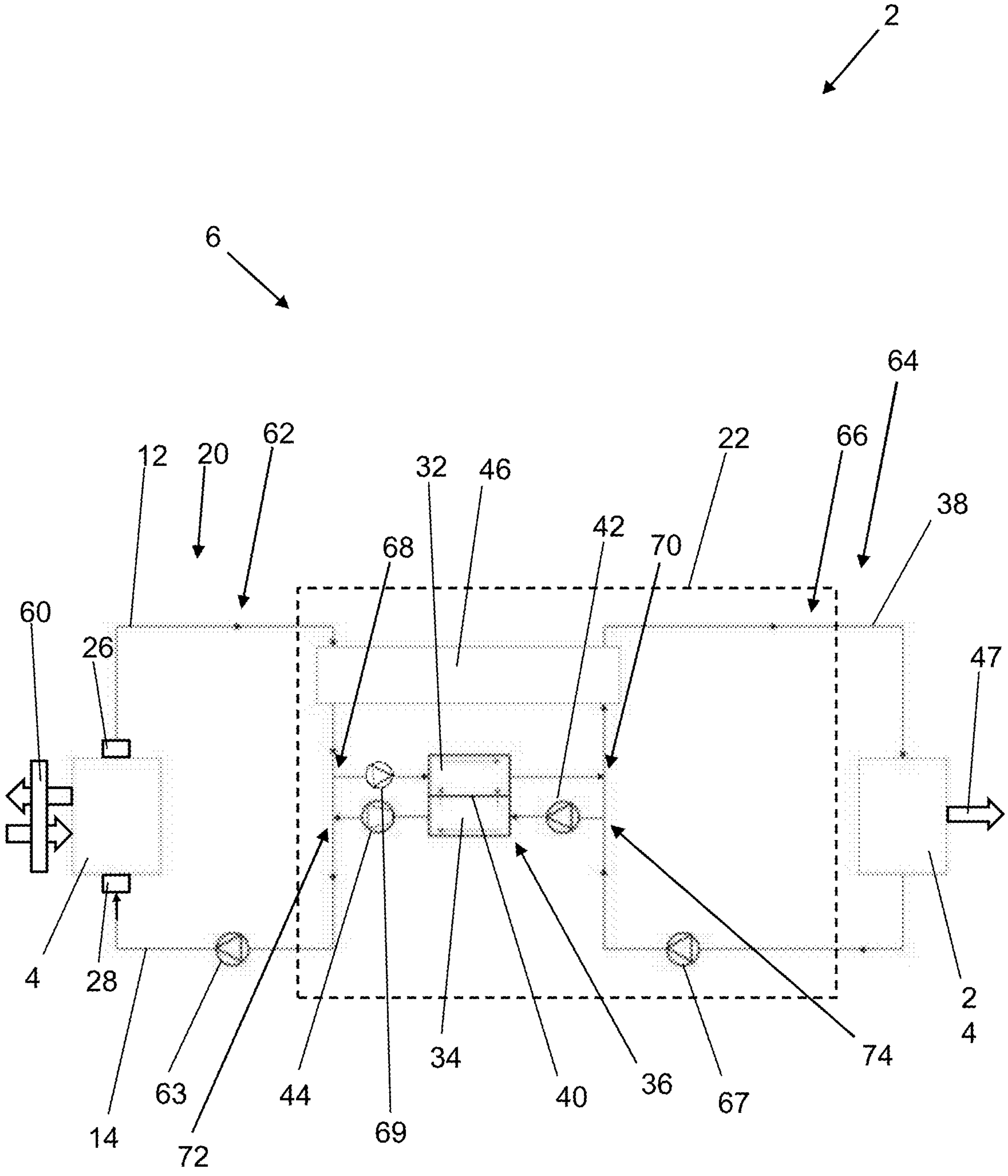
FIG. 4 is a more detailed schematic view of the dehumidifier system according to the second embodiment.

A second embodiment of the invention will now be described with reference to FIGS. 3 and 4, in which like reference numerals denote corresponding features. The second embodiment is similar to the first embodiment, therefore only the differences will be described here.

The dehumidifier system 2 of the second embodiment differs from that of the first embodiment in that the moist air flow 8 enters the dehumidifier 4 after passing through an air flow heat exchanger 60, and the dry air flow 10 exiting the dehumidifier 4 passes through the air flow heat exchanger 60. The air flow heat exchanger 60 is arranged to transfer heat from the dry air flow 10 (i.e. the airflow downstream of the dehumidifier 4) to the moist air flow 8 (i.e. the airflow upstream of the dehumidifier 4). Due to the latent heat of condensation being released as the moist air flow 8 gives up water to the desiccant solution, heat is released by the process. Although generally the majority of this heat goes into the desiccant solution, depending on the size and geometry of the dehumidifier 4 some of the heat is taken up by the air flow. The air flow heat exchanger 60 removing this heat and feeding it back into the dehumidifier 4 via the moist air flow 8 avoids this heat being lost to the dry air flow 10, allowing it to go into the desiccant solution instead (whereupon the heat can ultimately help to ensure that sufficient moisture can be evaporated from the desiccant solution, as discussed above). In addition, the air flow heat exchanger 60 removing heat from the dry air flow 10 can make the dry air flow a more pleasant temperature for a user, and/or may make it easier to cool the dry air flow to a target temperature if desired.

Like the first embodiment, the regenerator 6 of this embodiment has a desiccant recirculation system 20 with an inlet 26 connected to the dehumidifier 4 to receive therefrom a stream of desiccant solution containing moisture to be rejected 12, and an outlet 28 through which a regenerated stream of desiccant solution 14 is passed back to the dehumidifier. However, in this embodiment the circulation system 20 forms a first loop 62 around which desiccant solution can flow under action of a circulation pump 63, repeatedly passing through the dehumidifier 4.

The regenerator 6 also has a further recirculation system 64 which is arranged to circulate desiccant solution from the first diluter portion 32 to the first concentrator portion 34 via the evaporator 24. In this case, the further recirculation system 64 forms a second loop 66 around which desiccant solution can flow under action of a circulation pump 67, repeatedly passing through the evaporator 24.

Like the first embodiment, the regenerator 6 of the second embodiment comprises a desiccant concentration control system 22 comprising a combined diluter-concentrator device 36 in the form of a reverse osmosis unit. In this case, however, the first diluter portion formed by the desiccant diluter part 32 only receives a portion of the stream of desiccant solution containing moisture to be rejected 12. More particularly, the stream of desiccant solution containing moisture to be rejected 12 passes along the first loop 62, under action of a transfer pump 69 a portion of that stream 12 is diverted from the first loop 62 (and thus from the recirculation system 20) at a diversion junction 68 and passes to the desiccant diluter part 32, while the remainder of the stream 12 continues around the first loop 62 back towards the dehumidifier. Also, rather than the diluted stream 38 being formed entirely by the desiccant solution leaving the first diluter portion 32 as was the case in the first embodiment, in this embodiment the desiccant solution leaving the first diluter portion 32 is delivered to the further recirculation system 64, merging into the second loop 66 upstream of the evaporator 24 at a merge junction 70 and thereby forming the diluted stream 38. The diluted stream 38 then passes through the evaporator 24 as described previously.

Similarly, whereas in the first embodiment the first concentrator portion 34 receives all of the concentrated stream exiting the evaporator 24 and the flow of desiccant solution leaving the first concentrator portion 34 forms the entirety of the regenerated stream 38, this is not the case in the second embodiment. In this case the first concentrator portion 34 receives a portion of the diluted stream 38 from the evaporator 24, that portion being diverted from the second loop 66 at diversion junction 74. The first concentrator portion 34 then concentrates the desiccant solution through reverse osmosis as discussed previously, but concentrated desiccant leaving the first concentrator portion 34 is delivered to the first loop 62 of the recirculation system 20 at merge junction 72. The desiccant from the first concentrator portion 34 and the desiccant in the first loop 66 then combine to form the regenerated stream 14, which re-enters the dehumidifier 4 as discussed in respect of the first embodiment. While it is not solely responsible for formation of the regenerated stream 14, the first concentrator portion 34 nonetheless increases the concentration of desiccant solution in the recirculation system between the desiccant concentration control system 22 and the outlet 28, thereby functioning as the desiccant concentrator part.

The method of operation of the dehumidifier system 2 of the second embodiment therefore differs from that of the first embodiment in corresponding fashion. In the first embodiment desiccant solution went through a cycle of absorbing a quantity of water in the dehumidifier 4, being diluted, having the same quantity of water evaporated therefrom, being regenerated and then re-entering the dehumidifier 4. In the second embodiment a relatively concentrated stream of desiccant solution circulates around the first loop 62 and gradually receives water from the dehumidifier 4, a relatively dilute stream of desiccant solution circulates around the second loop 66 and gradually gives up water in the evaporator 24, and portions of the desiccant in each loop are diluted and fed to the other loop via the combined diluter-concentrator device 36.

The diverted portions passing between loops 62, 66 allows the system to be in a steady state despite the addition of water in the dehumidifier 4 and the removal of water in the evaporator 24. In the absence of these diverted portions, desiccant in the first loop 62 would gradually become more and more diluted due to the addition of water in the dehumidifier 4 and desiccant in the second loop 66 would gradually become more and more concentrated due to the loss of water in the evaporator 24.

The desiccant solution diverted from the first loop 62 allows net transport of water from the first loop 62 to the second loop 66, and the desiccant solution diverted from the second loop 66 allows the return of desiccant ions which accompanied that net transport of water. In other words, the first loop 62 loses some desiccant solution to the second loop 66 and receives some desiccant solution from the second loop 66. Due to the reverse osmosis device 36 the desiccant solution that the first loop 62 receives is more concentrated than the desiccant solution it loses, therefore the first loop 62 is continually re-concentrated. This continual re-concentration counteracts the addition of water in the dehumidifier, thereby keeping the first loop 62 in steady-state. Similarly, the second loop 66 receives some desiccant solution from the first loop 62 and loses some desiccant solution to the first loop. Due to the reverse osmosis device 36 the desiccant solution it receives is more dilute than the desiccant solution it loses, therefore the second loop 6 is continually re-diluted to counteract the loss of water from the evaporator 24.

In the present embodiment, the desiccant solution diverted from the first loop 62 is not only diluted by the first diluter portion 32 before being merged into the second loop 66, but is diluted to a concentration which is lower than the desiccant solution in the second loop 66 with which it is merged. Merging of the desiccant solution from the first diluter portion 32 therefore acts to re-dilute the desiccant solution in the second loop 66. Similarly, the desiccant solution diverted from the second loop 66 is not only concentrated by the first concentrator portion before being merged into the first loop 62, but is concentrated to a concentration higher than that of the desiccant solution in the first loop 62 with which it is merged. Thus, merging of the desiccant solution from the first concentrator portion 34 acts to re-concentrate the desiccant solution in the first loop 66. Were this not the case, the concentration of desiccant in the first loop 62 would gradually reduce and the concentration of desiccant in the second loop 66 would gradually increase, and other means would need to be provided to supplement the action of the reverse osmosis unit 36 to keep the system in steady-state (or intermittently return the concentrations of desiccant in the loops 62, 66 to their desired values).

The regenerator 6 of the second embodiment also differs from that of the first embodiment in the position of the desiccant stream heat exchanger 46. In the second embodiment the desiccant stream heat exchanger 46 is positioned to transfer heat from the desiccant solution in the first loop 62 upstream of diversion junction 68, into the desiccant solution in the second loop 62 which is downstream of the merge junction 70 and upstream of the evaporator 24. Nonetheless, the desiccant stream heat exchanger still acts to cool the desiccant which enters the first diluter portion 32 and to warm the desiccant entering the evaporator 24 for the reasons discussed above.

Third Embodiment

Figure 5:
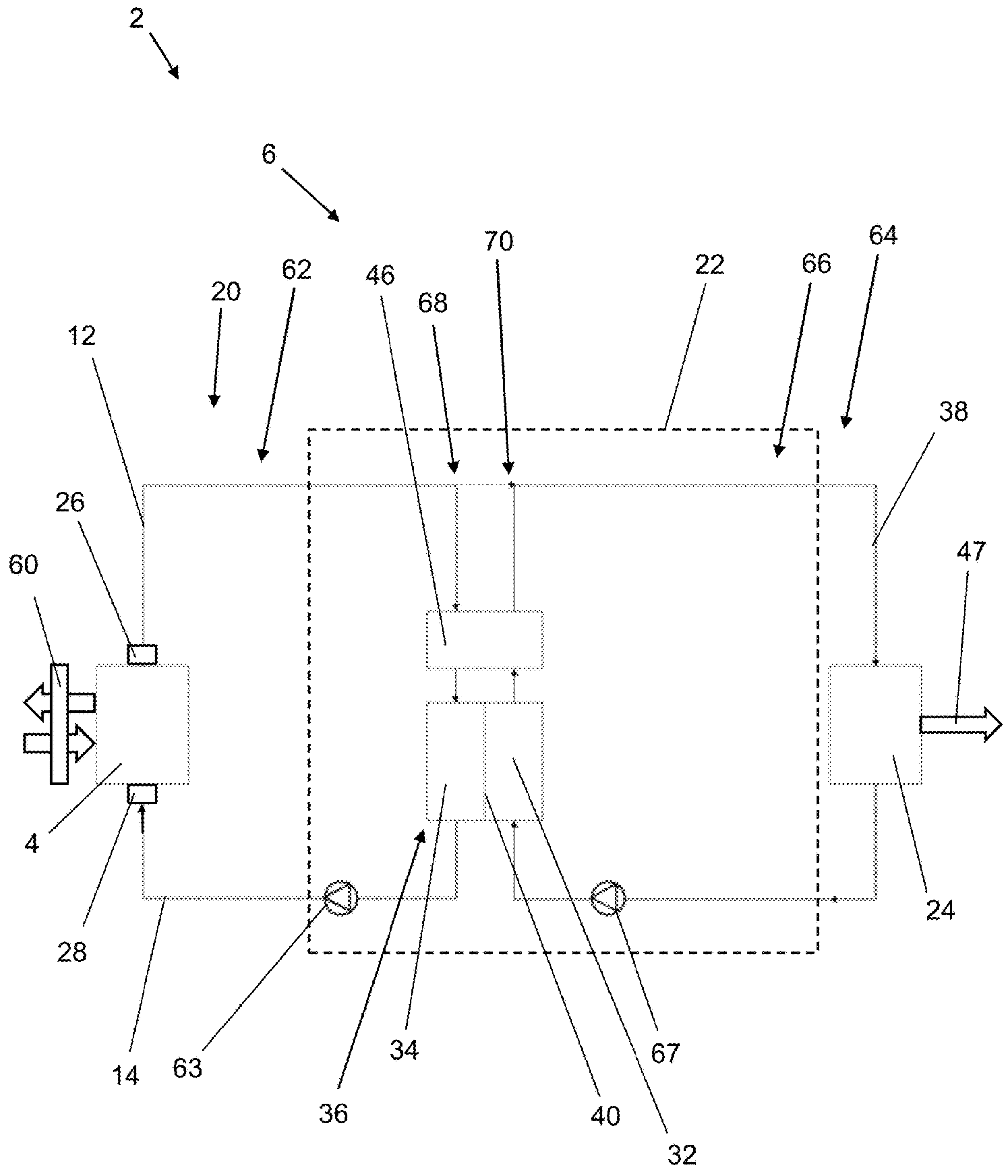
FIG. 5 is a schematic view of a dehumidifier system of an air conditioning system according to a third embodiment of the invention.

An air conditioning system according to a third embodiment of the invention will now be described with reference to FIGS. 5 and 6. The air conditioning system 80 comprises a dehumidifier system 2 which has a desiccant dehumidifier 4 and a regenerator 6, like the dehumidifier systems of the previous embodiments (the second embodiment in particular). Again, therefore, only the differences between this embodiment and previous embodiments will be discussed in detail.

Figure 6:
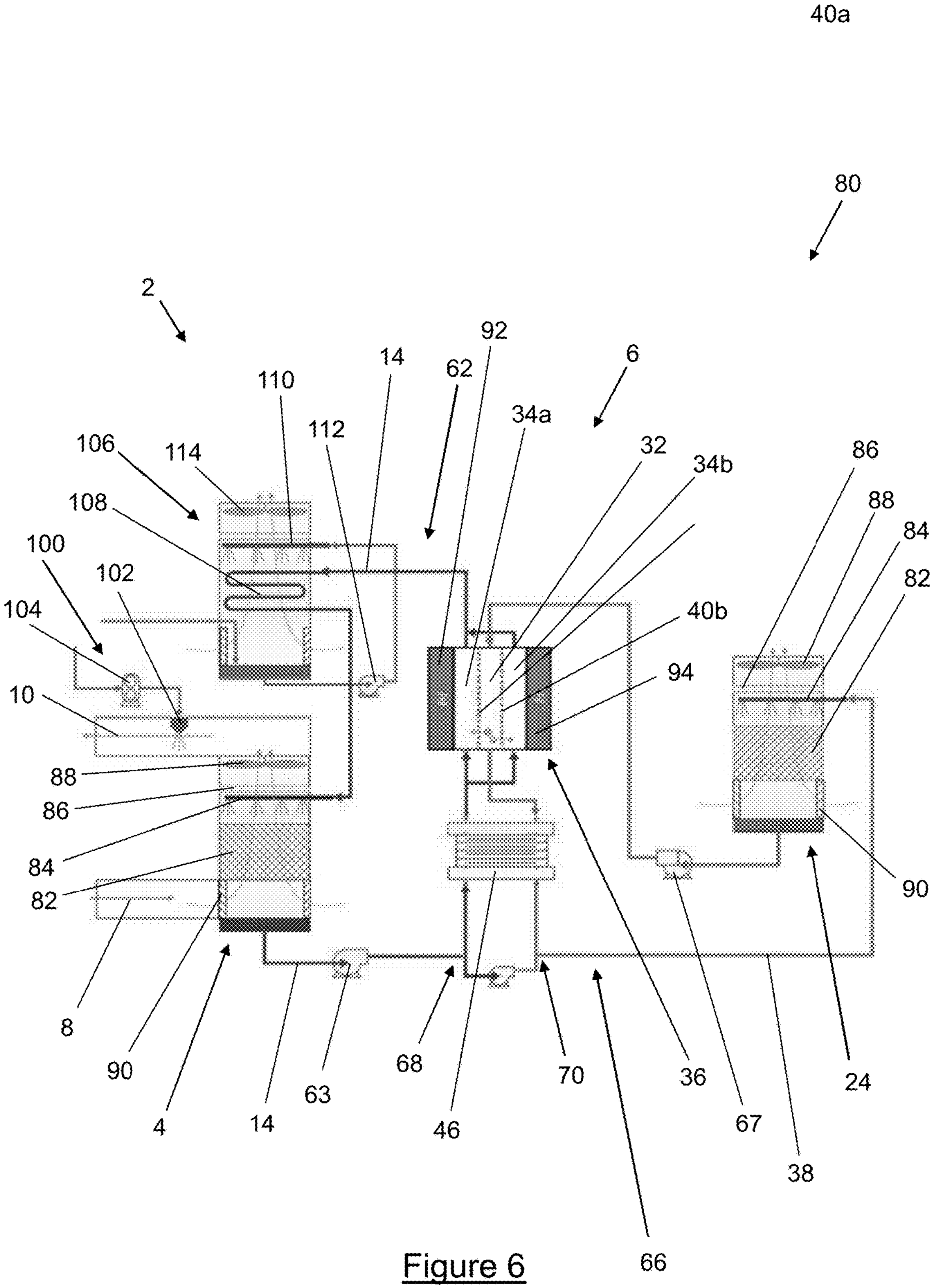
FIG. 6 is a schematic view of the air conditioning system of the third embodiment.

That being said, FIG. 6 shows some features of the dehumidifier 4 and the evaporator 24 of the third embodiment which are also present in the first and second embodiments but not shown in FIGS. 1 to 4. For both of these components FIG. 6 shows the high surface area media 82 discussed above, a spray nozzle 84 for spraying desiccant solution onto the media, and a drift eliminator 86. FIG. 6 also shows that the dehumidifier 4 and evaporator 24 each have a fan 88 for drawing air through it, and an inlet filter 90 for filtering debris out of that air.

Whilst the regenerator 6 of the third embodiment comprises a combined diluter-concentrator device 36, with a first diluter portion 32 and a first concentrator portion 34, in this embodiment the combined diluter-concentrator device 36 takes the form of an electrodialysis cell. Rather than transferring water through reverse osmosis as described above, the electrodialysis cell 36 transfers desiccant ions (i.e. lithium ions and chlorine ions in the present embodiment). An electric field, rather than physical pressure, brings about the movement of the ions. Accordingly, the third embodiment does not have a high pressure pump or a pressure energy recovery device.

In this embodiment the first concentrator portion 34 of the electrodialysis cell 36 is split into a pair of sub-parts 34*a*, 34*b* arranged in parallel with respect to the flow of desiccant solution (and physically in parallel in this particular case). Sandwiched between the sub-parts 34*a*, 34*b* is the first diluter portion 32. The first diluter portion 32 is separated from sub-part 34*a* by a membrane 40*a* and separated from sub-part 34*b* by a membrane 40*b*. Whereas the membranes 40 of the first and second embodiments were permeable by water, in the third embodiment the membranes 40*a*, 40*b* are permeable by ions. In particular, in the present case membrane 40*a* is permeable by chlorine ions and membrane 40*b* is permeable by lithium ions.

The electrodialysis cell 36 also has a cathode 92 and an anode 94. In use, a voltage is applied to them to positively charge the cathode 92 and negatively charge the anode 94, thereby applying an electric field to the desiccant solution in the first diluter portion 32 and the first concentrator portion 34*a*, 34*b*. The electric field draws chlorine ions (which are negatively charged) in the first diluter portion 32 towards the cathode 92, through membrane 40*a* and into sub-part 34*a*. Similarly, the electric field draws lithium ions (which are positively charged) in the first diluter portion 32 towards the anode 94, through membrane 40*b* and into sub-part 34*b*. Movement of desiccant ions out of the first diluter portion 32 and into the first concentrator portion 34 lowers the concentration of the desiccant solution in the first diluter portion 32 and raises the concentration of the desiccant solution in the first concentrator portion 34. As it exits the electrodialysis call 36, the desiccant solution in the two sub-parts 34*a*, 34*b* of the first concentrator portion 34 re-join one another.

It should be noted that while the electrodialysis cell 36 of this embodiment is shown as having three channels (two sub-parts 34*a*, 34*b* of first concentrator portion 34 with a one-part first diluter portion 32 positioned therebetween) and described accordingly, this is only for the purposes of illustration. In other embodiments the electrodialysis cell may have any suitable number of channels, for instance five channels (e.g. two sub-parts of the diluter portion interleaved between three sub-parts of the first concentrator portion, separated by the appropriate membranes), seven channels (e.g. three sub-parts of the diluter portion interleaved between four sub-parts of the first concentrator portion) or more.

The placement of the combined diluter-concentrator device 36 also differs in the third embodiment. Rather than desiccant diverted from the first and second loops 62, 66 flowing therethrough, in the present embodiment desiccant solution in the first loop 62 flows through the first diluter portion 32 and desiccant solution in the second loop 66 flows through the desiccant concentrator part 34. Indeed, in this embodiment some of the desiccant solution in the first loop 62 is diverted and merged into the second loop 66, but no desiccant is diverted from the second loop 66. Further, the desiccant diverted from the first loop 62 enters the second loop 66 at the same concentration as it was when it left the first loop. Thus in this embodiment, the desiccant diverted from the first loop 62 is diluted only by virtue of it being merged into the second loop 66.

Nonetheless, the regenerator 6 of the third embodiment can be held in steady state. In the present embodiment the desiccant diverted from the first loop 62 and merged into the second loop 66 provides the required net transport of water from the first loop 62, as with the second embodiment. However, the return of desiccant ions which accompany that transport of water are returned by the electrodialysis cell 36 rather than by diverting desiccant from the second loop 66. As described previously, the electrodialysis cell transports desiccant ions from the first diluter portion 32 (through which desiccant solution in the second loop 66 flows) into the first concentrator portion 34 (through which desiccant solution in the first loop 62 flows). This has the effect of adding desiccant ions back into the first loop 62, thereby re-concentrating it and countering the addition of water that takes place in the dehumidifier 4, and taking desiccant ions out of the second loop 66, thereby re-diluting it and countering the removal of water which takes place in the evaporator 24. This movement of ions from the second loop 66 to the first loop 62 also counters the movement of ions from the first loop 62 to the second loop 66 which takes place due to some of the desiccant solution being diverted from the former and merged into the latter. Thus, the first loop 62 is re-concentrated and the second loop 66 is re-diluted as with the second embodiment.

Whereas in the first and second embodiments the first diluter portion 32 of the combined diluter-concentrator device 36 performs the function of the desiccant diluter part in that it receives at least a portion of the stream of desiccant solution containing moisture to be rejected 12, dilutes it and supplies a diluted stream to the evaporator, this is not the case in the third embodiment. As noted above, the portion of said stream 12 that is diverted from the first loop 62 is diluted by the act of merging it with desiccant in the second loop 66 (thereby forming the diluted stream 38 that is supplied to the evaporator 24). Thus, in this embodiment it is the merge junction 70 that performs the function of the desiccant diluter part.

In the third embodiment, as with the second embodiment, the first concentrator portion 34 functions as the desiccant concentrator part in that it increases the concentration of desiccant in the recirculation system 20 intermediate the desiccant concentration control system 22 and the outlet 28. In this case however, as with the first embodiment, the first concentrator portion 34 forms the regenerated stream 14 in its entirety. More specifically, the first concentrator portion 34 moves desiccant ions into the portion of the stream of desiccant solution containing moisture to be rejected 12 that is not diverted from the first loop 62 (from the diluted stream 38 after evaporation) and thereby forms the regenerated stream 14 which continues around the first loop 62 to the outlet 28 and back into the dehumidifier 4.

The third embodiment also differs from the preceding embodiments in that it is an air conditioning system 80 comprising a dehumidifier system 2, rather than solely a dehumidifier system 2. Accordingly, as well as the dehumidifier system 2 the present embodiment comprises an air cooling device 100, more specifically an evaporative cooling device, arranged to draw heat out of (i.e. cool) the air exiting the dehumidifier system 2. The air cooling device 100 has a sprayer 102 to which water is supplied by a spray pump 104. The sprayer 102 is arranged to spray water from the spray pump 104 into the dry air flow 10. The water evaporates into the dry air flow 10, thereby drawing heat from the air flow and cooling it (as well as increasing the humidity of the dry air flow).

In the present embodiment cooling of the air is also provided by the desiccant solution itself. The desiccant solution, more particularly the regenerated stream 14, is passed through a cooling tower 106 which cools the stream 14 as discussed in more detail below. The desiccant solution is therefore cold when it enters the dehumidifier 4, so when sprayed into the air the desiccant solution not only draws water in from the air but also draws heat from the air. Thus, the air is cooled inside the dehumidifier 4, and then the dry air flow 10 is cooled further by the air cooling device 100. In a modification of the third embodiment the cooled desiccant may draw heat out of the air before the desiccant enters the dehumidifier 4, instead of or as well as drawing heat out of the air while inside the dehumidifier 4. For example, the cooled desiccant may run in a helical path around or through the path taken by the dry air flow 10.

In this specific case the cooling tower 106 is an indirect wet cooling tower. The desiccant solution is passed through a series of pipes 108. A spray nozzle 110 sprays water delivered by a spray pump 112 onto the pipes 108, and a fan 114 draws air through the pipes 108. The water evaporates into the air from the pipes 108, drawing heat from the pipes and thus from the desiccant solution inside.

Fourth Embodiment

Figure 7:
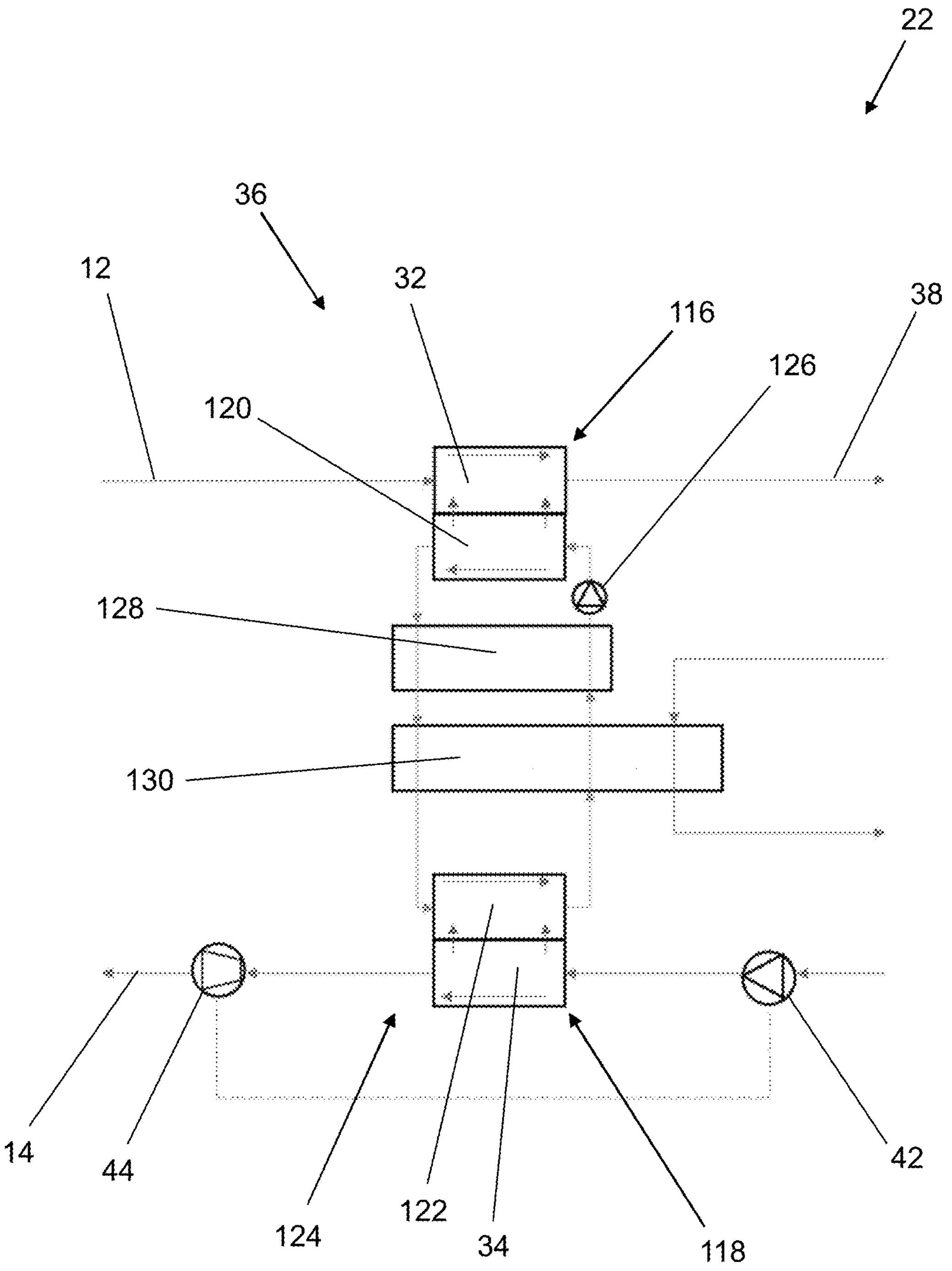
FIG. 7 is a schematic view of a desiccant concentration control system according to a fourth embodiment of the invention.

A desiccant concentration control system 22 according to a fourth embodiment of the invention is shown in FIG. 7. The desiccant concentration control system 22 may be used in place of that of the regenerator 6 of the first embodiment, for example, and will be described below in relation to use in that context.

Like the first embodiment, the combined diluter-concentrator device 36 of the fourth embodiment has a first diluter portion 32 which functions as the desiccant diluter part, in this case receiving all the stream of desiccant solution containing moisture to be rejected 12, diluting it by reverse osmosis and in doing so forming the entirety of the diluted stream 38 delivered to the evaporator 24. Similarly, the combined diluter-concentrator device 36 has a first concentrator portion 34 which functions as the desiccant concentrator part, in this case directly forming the regenerated stream 14 from the diluted stream 38 after the diluted stream 38 has passed through the evaporator 24. However, whereas in the first embodiment the combined diluter-concentrator device took the form of a single reverse osmosis unit comprising both the first diluter portion and the first concentrator portion, in this embodiment the first diluter portion 32 and the first concentrator portion 34 are part of separate reverse osmosis units. The first diluter portion 32 is part of a first reverse osmosis unit 116 of the combined diluter-concentrator device 36 and the first concentrator portion 34 is part of a second reverse osmosis unit 118 of the combined diluter-concentrator device 36.

The first reverse osmosis unit 116 also comprises a second concentrator portion 120, separated from the first diluter portion 32 by a semi-permeable membrane 40. Water can be moved from the second concentrator portion 120 to the first diluter portion 32 across a semi-permeable membrane 40 by reverse osmosis in the manner described above in respect of the reverse osmosis unit of the first embodiment. Similarly, the second reverse osmosis unit further comprises a second diluter portion 122, separated from the first concentrator portion 34 by a semi-permeable membrane 40. Again, water can be moved from the second concentrator portion 120 to the first diluter portion 32 across the membrane 40 by reverse osmosis in the manner described above in respect of the reverse osmosis unit of the first embodiment.

In this embodiment the combined diluter-concentrator device 36 includes an auxiliary fluid circulation system 124 which circulates an auxiliary fluid (in this specific case polyethylene glycol) between the second concentrator portion 120 and the second diluter portion 122. The Auxiliary fluid circulation system also has an auxiliary fluid pump 126, an auxiliary fluid heat exchanger 128 and a supplementary heat exchanger 130. In use, the polyethylene glycol is continually circulated around the auxiliary fluid circulation system 124 by circulation pump 126. The polyethylene glycol passes through the second concentrator portion 120 of the first reverse osmosis unit 116, through the auxiliary fluid heat exchanger 128, through the supplementary heat exchanger 130, through the second diluter portion 122 of the second reverse osmosis unit 118, back through the supplementary heat exchanger 130, back through the auxiliary fluid heat exchanger 128, back to the second concentrator portion 120 of the first reverse osmosis unit 116 and so on.

The purpose of the auxiliary fluid circulation system 124 is to provide a thermal buffer between the first diluter portion 32 and the first concentrator portion 34. As noted above, solutions generally heat up when diluted and cool down when concentrated, and this temperature change can sometimes be exploited (for instance the temperature of the diluted stream 38 being warm enables easier evaporation of water therefrom, as discussed above). The auxiliary fluid circulation system 124 avoids the desiccant in the first diluter portion 32 from interacting directly with the desiccant in the first concentrator portion 34, limiting the thermal transfer therebetween which could counteract the temperature change.

The auxiliary fluid heat exchanger 128 is arranged to transfer heat from the auxiliary fluid upstream of the second dilutor portion 122 to the auxiliary fluid upstream of the second concentrator portion 120. Thus, polyethylene glycol is cooled before entry to the second diluter portion 122 and warmed before entry to the second concentrator portion 120. The auxiliary fluid entering the second concentrator portion 120 having been warmed can counteract some of the cooling effect it experiences as it is concentrated. Thus, in the first reverse osmosis unit 116 the auxiliary fluid is cooled by concentration and the desiccant solution is warmed due to it being diluted, and there is some thermal conduction therebetween, but the desiccant solution nonetheless leaves the first diluter portion 32 at a relatively high temperature. Thus, it is easier for water to be evaporated therefrom in the evaporator 24.

Along similar lines, the polyethylene glycol being cooled before entry to the second diluter portion 122 counteracts some of the warming effect it experiences while being concentrated therein. Thus, the desiccant solution in the first concentrator portion 34 is still warmed due to being concentrated, but it remains at a relatively low temperature. This relatively low temperature can then be used to cool an air flow, for example as discussed in respect of the third embodiment. Indeed, so as to minimise the temperature of the desiccant solution, in this embodiment once the diluted stream 38 leaves the evaporator 24 and before it enters the first concentrator portion 34, a portion of it is passed through a cooling tower (not shown) of the same general structure and function as that of the third embodiment.

Since the auxiliary solution gains volume in the second diluter portion 122 due to the addition of water and loses volume in the second concentrator portion 120 due to the removal of water, there is a mismatch in the flow rates and specific heat capacities of the streams of auxiliary fluid passing through the auxiliary fluid heat exchanger 128. The effect of this is that additional heat input is needed in order to keep the auxiliary fluid circulation system 124, and thus the regenerator 6 as a whole, in steady state conditions. In the present embodiment that additional heat is provided by the diluted stream 38 after evaporation. More particularly, in this specific case a portion of the diluted stream 38 leaving the evaporator is diverted and passed through the supplementary heat exchanger 128, while the remaining portion passes through the cooling tower (not shown). The supplementary heat exchanger 130 of this embodiment is a 3-way heat exchanger and transfers heat from that desiccant solution, and from the auxiliary fluid passing through it from the first reverse osmosis unit 116 to the second reverse osmosis unit, into the auxiliary fluid passing from the second reverse osmosis unit 118 to the first reverse osmosis unit 116. The desiccant solution which passes through the supplementary heat exchanger 130, and the desiccant solution which passes through the cooling tower (not shown) then merge together before passing to the first concentrator portion 34.

Although polyethylene glycol has been selected as the auxiliary fluid in the present embodiment, this is purely an example and in other embodiments any other suitable liquid or solution may be selected. When selecting an auxiliary fluid there are two key properties which may be beneficial. Firstly, it can be advantageous for the auxiliary fluid to have an enthalpy of dilution which is lower than the desiccant solution. Accordingly, the heating effect brought about by diluting it and the cooling effect brought about by concentrating it is not as pronounced as is the case for the desiccant solution. As a result, when the desiccant solution and the auxiliary solution interact with one another in the first and second reverse osmosis units 116, 118, the heating/cooling of the desiccant solution due to dilution/concentration is counteracted to a lesser extent by the opposite temperature change in the auxiliary fluid. Thus, the desiccant solution leaves the first diluter portion 32 warmer and leaves the first concentration portion 34 cooler than would otherwise be the case.

Also, it may be advantageous for the auxiliary fluid to exhibit a decrease in osmotic pressure with an increase in temperature. This can be beneficial in that the concentration of the auxiliary fluid can be selected such that when the desiccant solution is cool and being concentrated in the first concentrator portion 34 (and the auxiliary fluid is cool and being diluted in the second diluter portion 122), the osmotic pressure of the auxiliary fluid can be set higher than the desiccant solution. This can reduce the osmotic pressure difference between the two solutions, making it easier for water to be drawn out of the desiccant solution and into the auxiliary solution. Similarly, when the desiccant solution is warm and being diluted in the first diluter portion 32 (and the auxiliary fluid is warm and being concentrated in the second concentrator portion 120), the osmotic pressure difference can make it easier to draw water out of the auxiliary fluid and into the desiccant solution.

Whilst the fourth embodiment uses reverse osmosis devices 116, 118 to interact the desiccant solution with the auxiliary solution by transferring water therebetween, it is equally possible to use electrodialysis? cells (such as the one discussed above in relation to the third embodiment) in order to transfer desiccant ions into and out of the auxiliary solution so as to dilute and concentrate the desiccant solution. Such an arrangement may use polyethylene glycol as above, or may use a different auxiliary fluid such as an aqueous solution of a different desiccant (for example magnesium bromide). In the case of the auxiliary fluid being an aqueous solution of a different desiccant, the selectivity of the membranes can be selected so as to allow the ions of the desiccant solution to pass through but not allow the passage of ions of the desiccant of the auxiliary solution (thereby avoiding leakage of auxiliary fluid into the desiccant solution).

Whilst the fourth embodiment has been described in relation to a regenerator 6 for a dehumidifier system 2, with aqueous desiccant solution forming the working fluid, the desiccant concentration control system 22 of this embodiment may be used as an apparatus for diluting a concentrated stream of a working solution (which may or may not be desiccant solution) and concentrating a dilute stream of the working solution in a different context. For example, it may be used as part of a water purification system.

Final Comments

Although the present invention has been described and illustrated with reference to particular embodiments, it will be appreciated by those of ordinary skill in the art that the disclosure lends itself to many different variations not specifically illustrated herein.

By way of example, in some embodiments rather than a direct contact device the dehumidifier and/or the evaporator may be a membrane exchanger. In such a device desiccant solution would be pumped on one side of a water permeable membrane and air is blown along the other side, with water then passing through the membrane without direct contact between the air and the desiccant solution. One advantage of such a device is that since the desiccant solution is fully contained within the membrane and not directly exposed to the air, there is no risk of desiccant solution becoming entrained in the air. However, such devices may be more complicated and thus expensive, and/or may transfer less water to/from the desiccant solution than a direct contact device of comparable size.

As another example, in a modification of the second embodiment the desiccant stream heat exchanger may be positioned such that only the portion of the stream of desiccant solution containing moisture to be rejected which passes through the first diluter portion passes through it.

As a further example, in a modification of the second embodiment the dehumidifier system comprises a heat exchanger bypass arrangement and a cooling tower, and the evaporator is configurable to encourage heat to be drawn into the diluted stream of desiccant solution from air inside the evaporator. The heat exchanger bypass arrangement comprises a heat exchanger bypass passage connected in the first loop, in parallel with the desiccant stream heat exchanger. Valves at either end of the bypass passage can be moved between a first configuration in which desiccant in the first loop is directed through the bypass passage rather than through the desiccant stream heat exchanger, and a second configuration in which desiccant is directed through the desiccant stream heat exchanger rather than the bypass passage. Accordingly, in use the dehumidifier system can bypass the desiccant stream heat exchanger (by placing the valves in the first configuration) and re-engage the desiccant stream heat exchanger (by placing the valves in the second configuration).

In this modification the evaporator is configurable to draw heat into the diluted stream of desiccant solution from air inside the evaporator by virtue of a fan which draws ambient air through the evaporator at a high flow rate. The fan can be turned off when not required, or turned on to increase the throughput of air through the evaporator. Increasing the throughput of air means that if heat is drawn from the air into the desiccant, that air is replenished by fresh (i.e. hotter) air and more heat can be drawn into the desiccant.

This modification is suited to applications where ambient air is or can be particularly hot. When ambient air is particularly hot, it may be hotter than the stream of desiccant solution containing moisture to be rejected. In such circumstances the desiccant in the second loop may not experience the cooling effect in the evaporator described above, meaning that heat cannot be transferred from the first loop to the second loop. With this being the case, the desiccant running through the desiccant stream heat exchanger may be counterproductive, transferring heat in the opposite direction to that described above. Bypassing the desiccant stream heat exchanger can reduce or prevent this negative effect.

When the ambient air is particularly hot, the evaporator can be configured to encourage heat to be drawn into the diluted stream of desiccant from air inside the evaporator by turning on the fan. With the ambient air heating the desiccant in the second loop, its temperature increases. This has the effect of raising its vapour pressure, thereby increasing the prevalence of moisture evaporation. Indeed, the increase in vapour pressure that can be achieved in this way may allow the concentration of desiccant in the second loop to be higher than would otherwise be possible for a given rate of moisture evaporation. If a higher concentration can be tolerated in the second loop, the extent to which it must be diluted in the combined diluter-concentrator device is reduced, and thus the power consumption of the device may be reduced as well.

With the desiccant being heated rather than cooled in the evaporator when ambient air is particularly hot, there is a net input of heat into the system. In the present modification this is counteracted by the cooling tower, which cools the desiccant and thereby keeps the system in a steady state. In this particular modification the cooling tower is substantially the same as that described in relation to the third embodiment, and is located at a corresponding position in the dehumidifier system (i.e. in the first loop, upstream of the desiccant dehumidifier).

In this modification there is a single bypass passage, positioned in the first loop. Thus, desiccant in the second loop always passes through the desiccant stream heat exchanger (but when it is bypassed desiccant in the first loop does not, so substantially no heat exchange takes place). In an alternative modification, there is a corresponding bypass passage in the second loop. This can avoid the desiccant stream heat exchanger having any negative effects on the flow of desiccant in either loop (for instance if it forms a flow restriction) as well as on the transfer of heat.

In the foregoing description, where integers or elements are mentioned which have known, obvious or foreseeable equivalents, then such equivalents are herein incorporated as if individually set forth. Reference should be made to the claims for determining the true scope of the present disclosure, which should be construed so as to encompass any such equivalents. It will also be appreciated by the reader that integers or features of the disclosure that are described as preferable, advantageous, convenient, or the like, are optional and do not limit the scope of the independent claims. Moreover, it is to be understood that such optional integers or features, while of possible benefit in some embodiments of the disclosure, may not be desirable, and can therefore be absent, in other embodiments.

The invention claimed is:

1. An apparatus for rejecting moisture from a desiccant solution and regenerating the desiccant solution for re-use, the apparatus comprising:

a desiccant recirculation system comprising an inlet for receiving a stream of desiccant solution containing moisture to be rejected, and an outlet for delivering a stream of regenerated desiccant solution;

an evaporator; and a desiccant concentration control system which is connected to the recirculation system intermediate the inlet and outlet of the recirculation system and comprises a desiccant diluter part that is configured and arranged to receive at least a portion of the stream of desiccant solution containing moisture to be rejected and to dilute the same and supply a diluted stream of desiccant to the evaporator, and a desiccant concentrator part that is configured and arranged to increase the concentration of the desiccant solution in the recirculation system intermediate the desiccant concentration control system and the outlet, thereby to regenerate the desiccant solution that is supplied to the outlet, wherein the evaporator is arranged to receive the diluted stream and to evaporate moisture therefrom, wherein the desiccant concentration control system integrates the desiccant diluter part and the desiccant concentrator part to produce a combined diluter-concentrator device, wherein the desiccant diluter part comprises a first diluter portion arranged to receive and dilute the at least a portion of the stream of desiccant solution containing moisture to be rejected, and a second diluter portion, wherein the desiccant concentrator part comprises a first concentrator portion arranged to receive and concentrate at least a portion of the diluted desiccant stream from the evaporator, thereby to regenerate the desiccant solution, and a second concentrator portion, wherein the desiccant concentrator control system further comprises an auxiliary fluid circulation system arranged to circulate an auxiliary fluid between the second diluter portion and the second concentrator portion, and wherein the combined diluter-concentrator device is adapted to transport water and/or desiccant ions between the first diluter and the second concentrator portions and between the second dilutor portion and the first concentrator portion.

2. The apparatus of claim 1, wherein the combined diluter-concentrator device comprises at least one reverse osmosis device.

3. The apparatus of claim 1, wherein the combined diluter-concentrator device is connected with the recirculation system such that first diluter portion receives the stream of desiccant solution containing moisture to be rejected from the inlet and delivers the moisture to the evaporator, and the first concentrator portion receives the diluted desiccant stream from the evaporator and delivers the diluted desiccant stream to the outlet.

4. The apparatus of claim 1, wherein the desiccant concentration control system comprises a further recirculation system for circulating dilute desiccant solution from the first diluter portion to the first concentrator portion via the evaporator; wherein the first diluter portion is arranged to receive a portion of the stream of desiccant solution containing moisture to be rejected from the recirculation system and to deliver dilute desiccant solution to the further recirculation system; and the first concentrator portion is arranged to receive dilute desiccant solution from the evaporator and deliver concentrated desiccant to the recirculation system.

5. A dehumidifier system comprising a desiccant dehumidifier which utilises a desiccant solution and the apparatus of claim 1 for rejecting moisture from the desiccant solution and regenerating the desiccant solution for re-use.

6. An air conditioning system comprising the dehumidifier system of claim 5 and an air cooling device which is configured and arranged to receive air exiting the dehumidifier system.

7. The apparatus of claim 2, wherein the reverse osmosis device is a counter-flow reverse osmosis device.

* * * * *